July 3, 1951

E. GARNICH 2,559,422

MACHINE FOR MOLDING CONCRETE BLOCKS

Filed July 15, 1949

INVENTOR.

Emil Garnich

BY Victor J. Evans & Co.

ATTORNEYS

July 3, 1951  E. GARNICH  2,559,422
MACHINE FOR MOLDING CONCRETE BLOCKS
Filed July 15, 1949  5 Sheets-Sheet 2

INVENTOR.
Emil Garnich
BY Victor J. Evans & Co.
ATTORNEYS

July 3, 1951  E. GARNICH  2,559,422
MACHINE FOR MOLDING CONCRETE BLOCKS
Filed July 15, 1949  5 Sheets-Sheet 4

INVENTOR.
Emil Garnich
BY Victor J. Evans & Co.
ATTORNEYS

July 3, 1951 E. GARNICH 2,559,422
MACHINE FOR MOLDING CONCRETE BLOCKS
Filed July 15, 1949 5 Sheets-Sheet 5
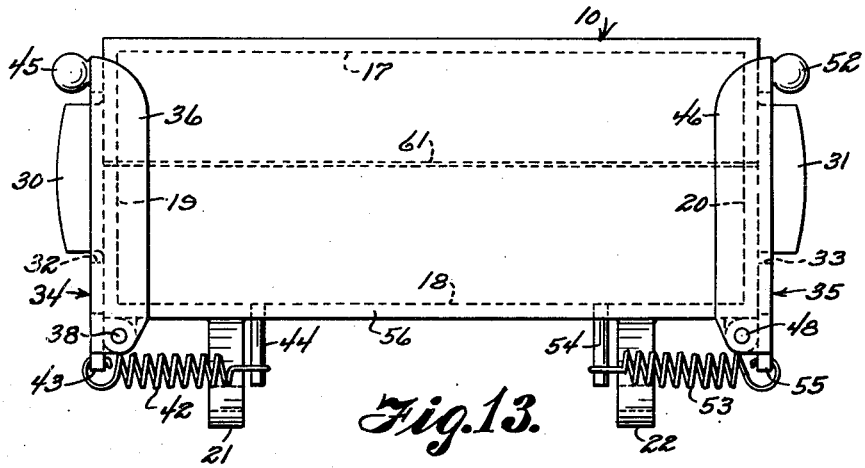
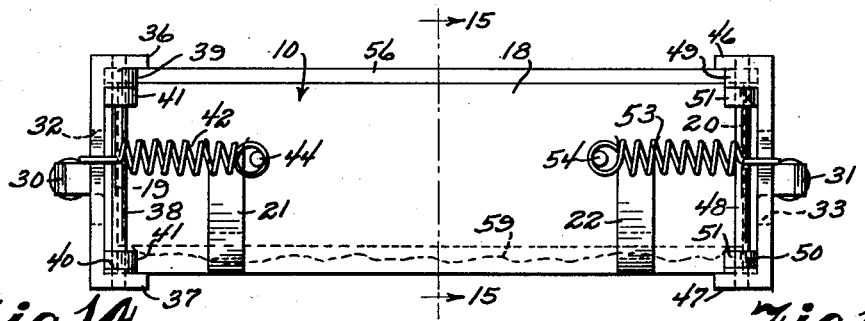
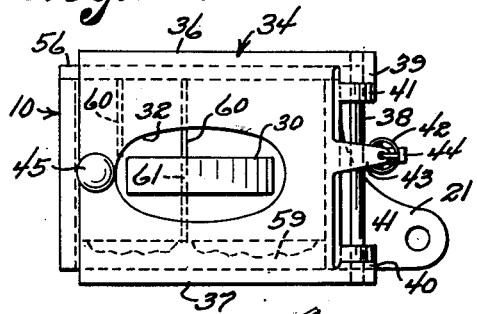
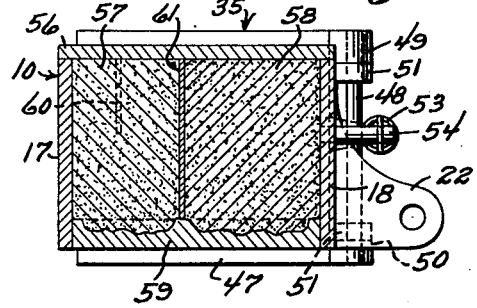
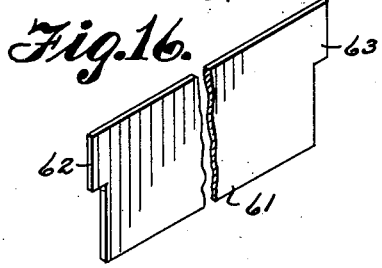
INVENTOR.
Emil Garnich
BY Victor J. Evans & Co.
ATTORNEYS Patented July 3, 1951

2,559,422

UNITED STATES PATENT OFFICE 2,559,422

MACHINE FOR MOLDING CONCRETE BLOCKS

Emil Garnich, Egg Harbor City, N. J.

Application July 15, 1949, Serial No. 104,898

10 Claims. (Cl. 25—41)

This invention relates to machine molding of blocks for building construction for blocks made of cinders, waylite, pumice, sand, cement and other similar materials and also of stone for backing, and in particular a machine of the stripper type where blocks are cast in a mold face down, vibrated, and then turned completely over and ejected vertically from the mold.

The purpose of this invention is to facilitate machine molding of blocks for building construction and to provide a stripper block machine where blocks are cast face downward in a solid rectangular shape mold and ejected from the mold in rapid succession as the position of the mold is inverted.

The usual stripper block machine, being stationary, makes it necessary to cast the blocks with the face on one side and for this reason only plain blocks can be made. In the old style face block machine blocks are made face down and of just damp material, which makes a very weak block. Machines of this type open up all around and pull material off of the body of the block should wet material be used. In the machine of this invention wet material is used for strength and the block is stripped out of the mold, making rock face down and turning the mold and block over for removing the block. With this thought in mind this invention contemplates a machine molding process for cementitious materials wherein the blocks are poured with forms in an inverted position or with the face downward and vibrated in this position, and then inverted so that the blocks may be ejected from the mold by a vertical upward movement.

The object of this invention is, therefore, to provide means for forming a mold for casting concrete blocks and the like wherein lower forming plates are secured in the mold by inwardly extended flanges on end members hinged to the ends of the form when the position of the mold is inverted.

Another object of the invention is to provide a machine for operating a concrete block mold wherein the block may be cast and vibrated in the inverted position and then turned over to an upright position for ejection from the mold.

A further object of the invention is to provide an improved concrete mold in combination with a machine for operating the mold in which the machine and mold are simple and economical construction.

With these and other objects and advantages in view the invention embodies a rectangular shape stand having a block forming mold thereon, a support plate in the upper part of the frame positioned to receive the mold for casting, means for vibrating the plate, and a manually actuated projector mounted on the side of the frame on which the mold is held, and positioned to be actuated upwardly through the mold for ejecting blocks cast therein.

Other features and advantages of the invention will appear from the following description taken in connection with the drawings wherein:

Figure 9 is a detail illustrating one of the block ejecting arms and with parts broken away.

Figure 10 is a detail illustrating one of the guides of the block ejecting arms with parts omitted and parts shown in section.

Figure 11 is a detail illustrating a brace for supporting the mold holding frame shown in Figure 12.

Figure 12 is a plan view of the mold with the machine parts omitted.

Figure 13 is a side elevational view of the mold shown in Figure 12.

Figure 14 is an end elevational view of the mold shown in Figures 12 and 13.

Figure 15 is a cross section through the mold taken on line 15—15 of Figure 13.

Figure 16 is a detail illustrating an intermediate partition for use in the mold for forming a plurality of blocks in a single mold.

Figure 1:
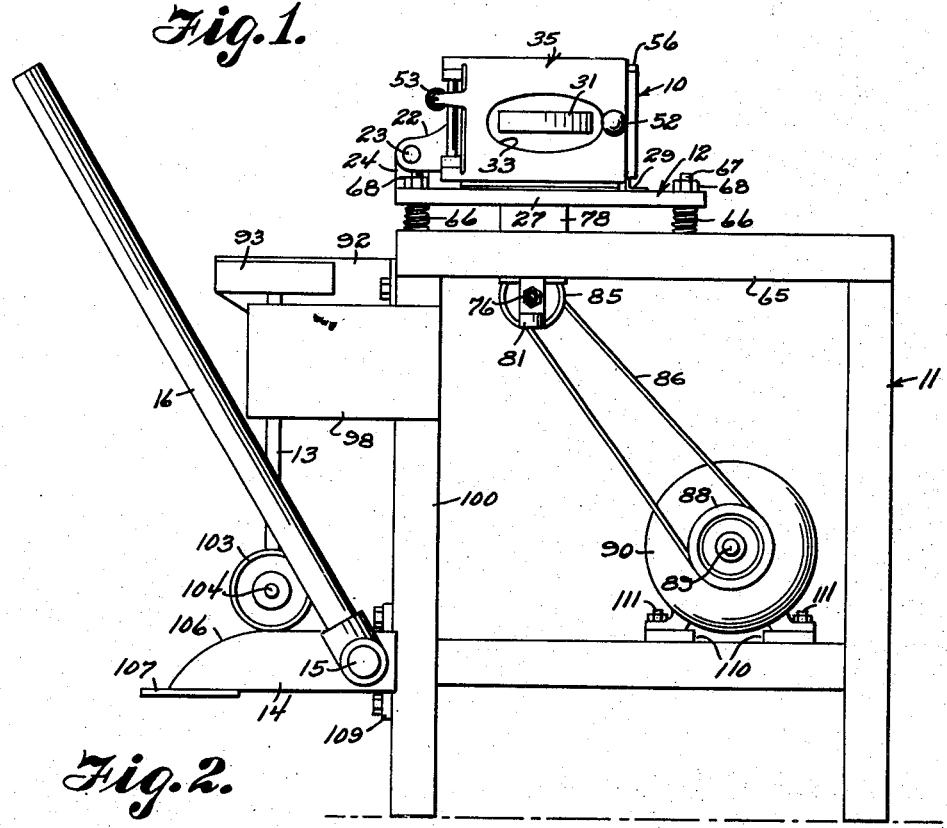
Figure 1 is an end elevational view of a stripper block machine with a mold hinged to the upper edge thereof positioned on a vibrating panel on the upper end of the machine.
Figure 2:
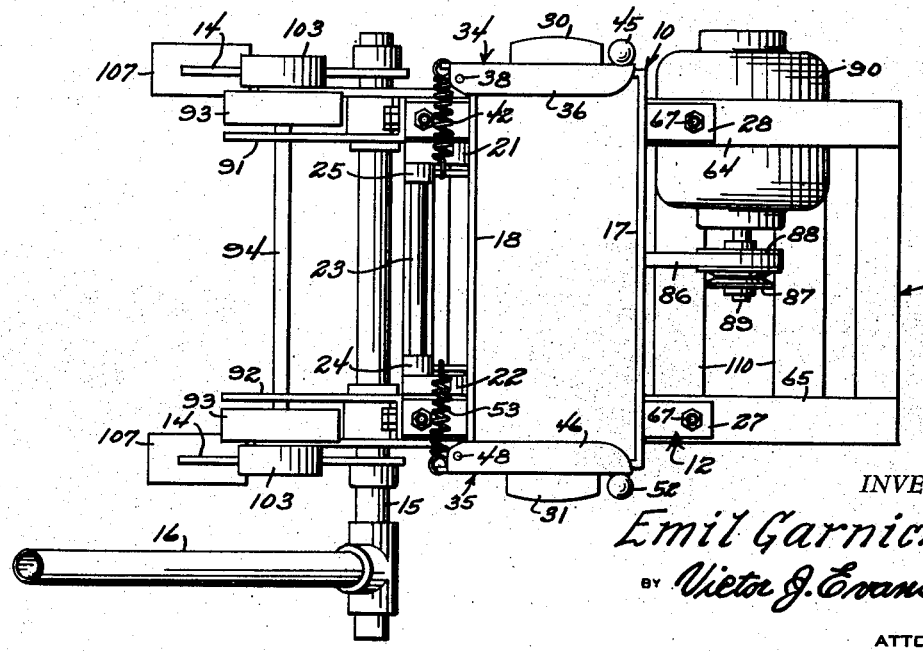
Figure 2 is a plan view of the machine showing the mold in the position shown in Figure 1.

Referring now to the drawings wherein like reference characters denote corresponding parts the improved building construction block mold of this invention includes a rectangular shaped frame 10 mounted on a stand 11 with a vibrator plate 12 positioned on the stand, and with ejector arms 13 mounted for vertical sliding movement in the frame. The arms are actuated by cam-like arms 14 which are pivotally mounted on the frame by a shaft 15 and the arms are actuated by a handle 16.

The frame 10 of the form is made with side walls 17 and 18 and end walls 19 and 20 and, as shown in Figure 12, the side wall 18 is provided with extending bearing lugs 21 and 22 by which the mold is pivotally mounted on a shaft 23 in bearings 24 and 25 on a cross bar 26 of the supporting vibrator frame 12, which has end rails 27 and 28 held by a tie bar 29.

Figure 6:
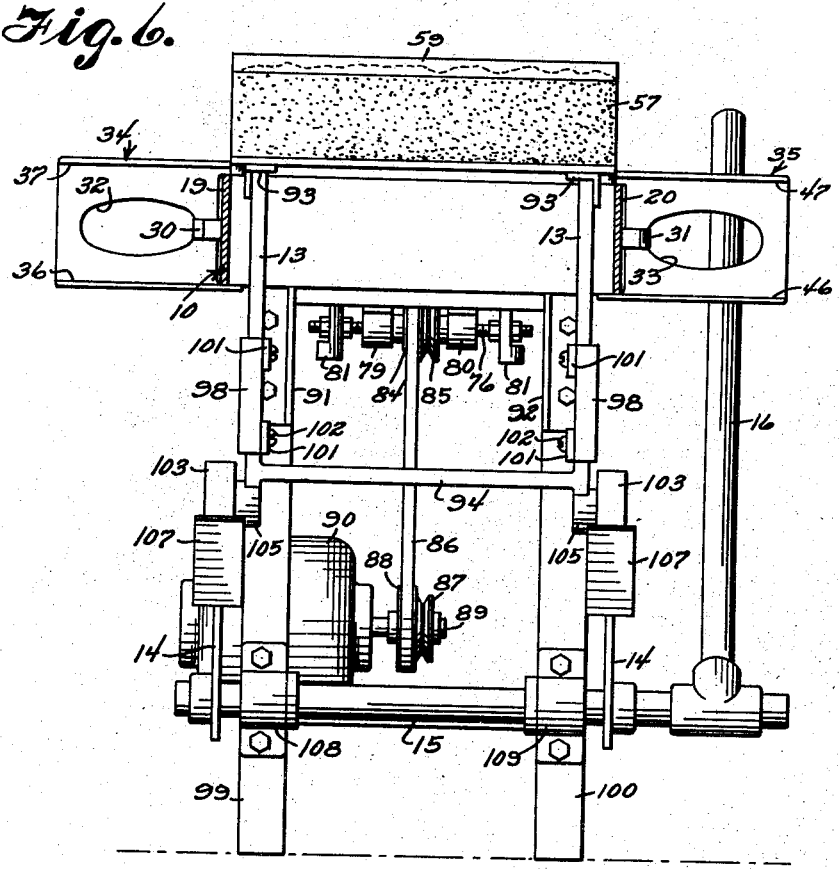
Figure 6 is a side elevational view of the machine showing a longitudinal section through the mold and with flanged ends thereof in the open position.

The end walls 19 and 20 of the mold frame 10 are provided with projections 30 and 31 that form handles and these projections extend through openings 32 and 33 in end plates 34 and 35, respectively, positioned against the ends of the mold frame when turning the mold. The plate 34 is provided with flanges 36 and 37 that extend from the upper and lower edges thereof, respectively and the plate is hinged to the frame by a pin 38 in lugs 39 and 40 on the mold. The pin extends through a lug 41 on the plate and also through the flanges 35 and 36 thereof. The end plate 34 is resiliently held outwardly by a tension spring 42, one end of which is attached to a projection 43 on the end of the plate, and the other on a pin 44 extended outwardly from the sidewall 18 of the mold. The opposite end of the end plate 34 is provided with a knob 45 by which it is held inwardly in the position shown in figure by hand when the mold is turned. The end plate 35 which is provided with flanges 46 and 47 is pivotally mounted by a pin 48 in the lugs 49 and 50 of the mold with the pin extended through a lug 51 on the plate and also through the flanges 46 and 47 thereof. This plate is provided with a knob 52 and a spring 53 carried by a pin 54 and attached to a projection 55 of the plate resiliently holds the plate outwardly away from the end of the mold, as shown in Figure 6.

Figure 3:
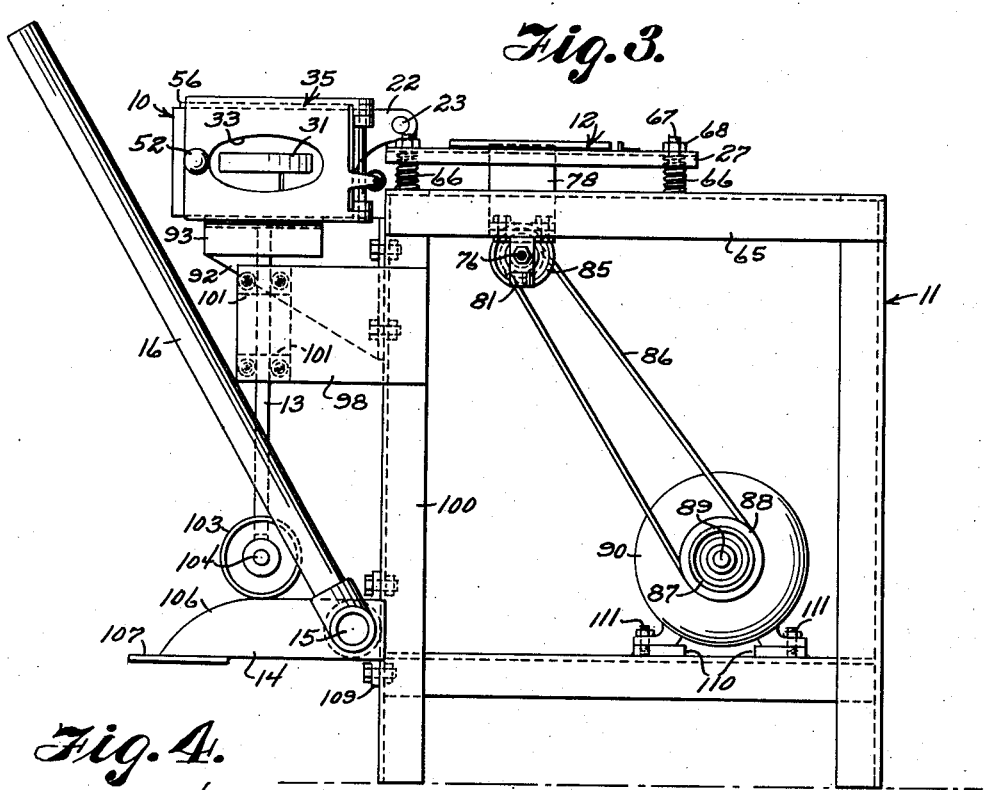
Figure 3 is a similar end elevational view showing the mold swung over the pivot and positioned on a supporting frame from which finished units are ejected from the mold.
Figure 4:
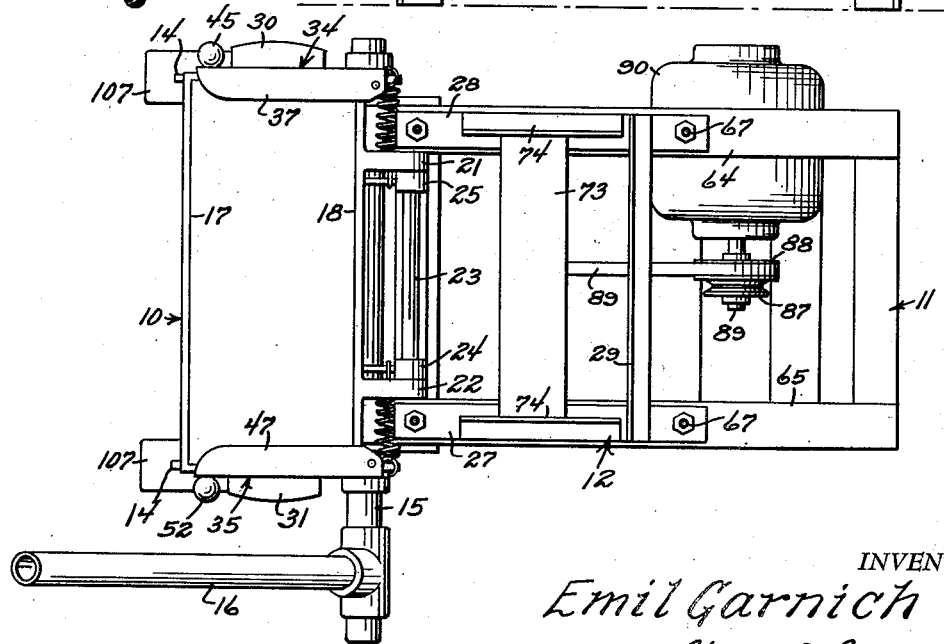
Figure 4 is a plan view of the machine illustrating the mold in the position shown in Figure 3.

The flanges 36 and 46 of the end plates overlap the ends of a pallet 56 and secure the plate in position against blocks 57 and 58 in the mold when the mold is turned to the inverted positions shown in Figure 3. A face plate 59 with a rock design thereon is secured in the opposite end of the mold by the flanges 37 and 47.

The end and side walls of the mold may be provided with slots 60 as indicated by the dotted lines in Figures 14 and 15 and partitions 61 may be extended across the mold with projection 62 and 63 thereof positioned in the slots 60. The mold may, therefore, be used to form one continuous block or a plurality of blocks may be formed therein and the blocks may be of different sizes.

The mold is pivotally mounted on the shaft 23 and the shaft is carried by the bearings 24 and 25 of the cross bar 26 at the ends of the rails 27 and 28, and the rails are resiliently suspended above side beams 64 and 65 of the frame 11 by a plurality of springs 66 on bolts 67 with nuts 68 thereon, as illustrated in Figures 1 and 3. The bolts extend upwardly from the side beams 64 and 65 and are positioned in openings 69 and 70 of the rail 27, and 71 and 72 of the rail 28.

Figure 7:
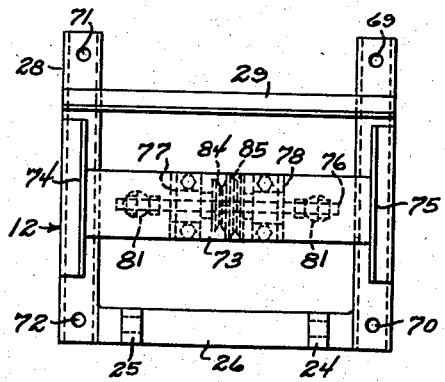
Figure 7 is a plan view illustrating the mold supporting frame which holds the mold as blocks are formed therein.
Figure 8:
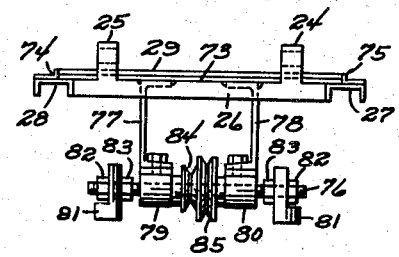
Figure 8 is a side elevational view of the mold supporting frame shown in Figure 7.

A plate 73 is extended across the rails 27 and 28 with the ends held between stops 74 and 75 as shown in Figures 7 and 8.

A vibrator shaft 76 is suspended below the plate 73 of the vibrator elements 12 by channels 77 and 78 with the shaft mounted in bearings 79 and 80 on the lower ends of the channel, as shown in Figure 8. The ends of the shaft are provided with eccentric elements 81 that are positioned between nuts 82 and 83 and pulleys 84 and 85 are positioned on the intermediate part of the shaft over which a belt 86 from pulleys 87 and 88 may be trained and the pulleys 87 and 88 are positioned on a motor shaft 89 of a motor 90. As the motor rotates the belt drives the shaft 76 and as the elements 81 are carried around by the ends of the shaft vibrations will be imparted to the plate 73 to the rails 27 and 28 and from the rails to the mold frame 10 with the mold positioned upon the rails and plate 12 as shown in Figure 1.

Figure 5:
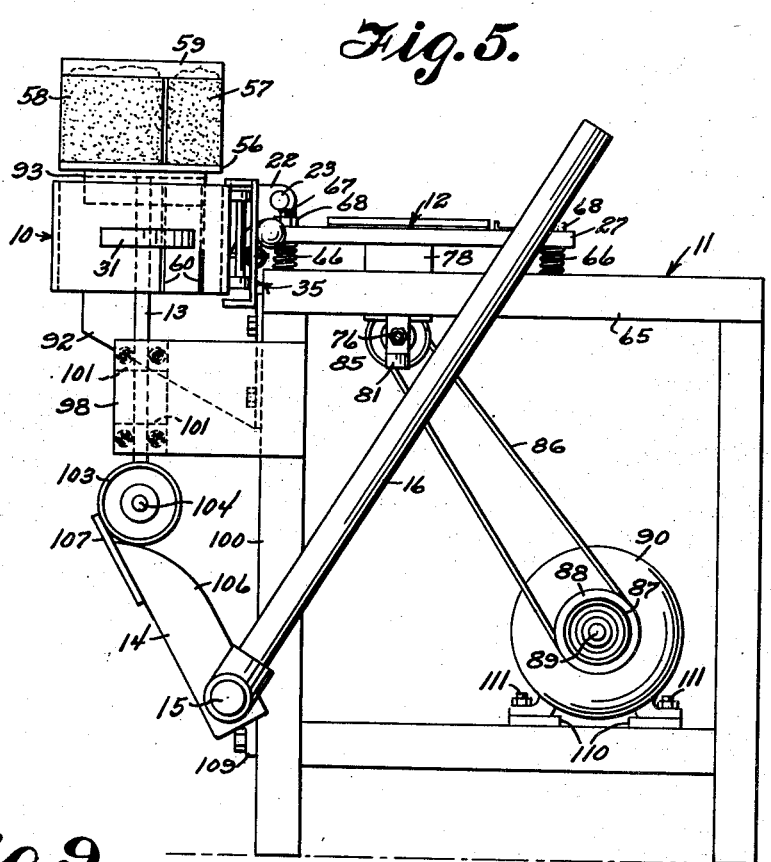
Figure 5 is also an end elevational view of the machine showing the mold in the ejecting position and illustrating the ejecting elements at the end of the ejecting cycle and with a finished block positioned above the mold.

The concrete or other material is poured into the mold with the mold on the vibrator 12, as shown in Figure 1 and after the material is of a consistency permitting handling the pallet 56 is inserted and the mold is turned over to the position shown in Figure 5 where it rests upon the braces or brackets 91 and 92 wherein it is positioned directly above the ejector 13. The ejectors 13 are provided with horizontally disposed angle irons 93 or heads and the lower ends are connected by a cross bar 94. The vertically disposed members or arms of the ejector 13 are slidably held in sockets 95 between upper lugs 96 and lower lugs 97 on the outer end of a plate 98 that extends outwardly from vertical supports 99 and 100 of the frame 11. Plates 101 are secured to the lugs 96 and 97 by screws 102 for holding the arms of the ejector 13 in the sockets. The lower ends of the ejectors are provided with rollers which are mounted on pins 104 in bearings 105.

The rollers 103 ride upon arcuate surfaces 106 of the cams 14 and the outer ends of the cams are provided with plates 107 that provide stops to limit the movement of the cams as illustrated in Figure 5. The cam elements 14 are carried by the shaft 15 which is journaled in bearings 108 and 109 on the legs 99 and 100, respectively, of the frame 11. A platform 110 is provided in the lower part of the frame 11 for the motor 90 and the motor is bolted to the platform with bolts 111, as shown.

With the parts arranged in this manner the mold 10 with the face forming plate 59 therein is positioned on the vibrator 12, as shown in Figure 1. After shaking the mold filled with the cementitious material for a short period of time the pallet 56 is inserted and the mold is then turned over to the position shown in Figure 3, and by actuating the ejectors with the handle or lever, the completed block is ejected upwardly through the mold, as illustrated in Figure 5, and the completed block may readily be removed from the heads or bars 93.

It will be understood that this machine may be used for casting blocks, bricks, lintels, sills and slabs and the position of the casting frame may be reversed as disclosed for removing the cast block or the blocks may be removed directly from the frame with the frame positioned on the stand or on the vibrating plate 12.

It will be understood that modifications may be made in the design and arrangement of the parts without departing from the spirit of the invention.

What is claimed is:

1. A mold for blocks of cementitious material comprising a rectangular shaped frame having side and end walls, end plates having flanges on the edges hinged to corners of the frame and positioned to be held against the said end walls with the flanges thereof extended across the edges of said end walls, resilient means urging the said end plates to outwardly extended positions, a facing plate positioned in the bottom of the frame, and a pallet in the top of the frame for retaining the block in the mold, said facing plate and pallet held in position in the frame by the flanges of the said end plates.

2. A mold for blocks of cementitious material comprising a rectangular shaped frame having side and end walls with projections on the said end walls forming handles, end plates having flanges on the edges and openings therethrough for receiving the projections of the end walls hinged to the corners of the frame and positioned to be held against the said end walls with the flanges thereof extended across the edges of said end walls, resilient means urging the said end plates to outwardly extended positions, a facing plate positioned in the bottom of the frame, and a pallet in the top of the frame, said facing plate and pallet held in position in the frame by the flanges of the said end plates.

3. A mold for blocks of cementitious material comprising a rectangular shaped frame having side and end walls, end plates having flanges on the edges hinged to corners of the frame and positioned to be held against the said ends walls with the flanges thereof extended across the edges of said end walls, resilient means urging the said end plates to outwardly extended positions, a facing plate positioned in the bottom of the frame, a pallet in the top of the frame, said facing plate and pallet held in position in the frame by the flanges of the said end plates, and a partition extended across said frame dividing the frame into sections.

4. A mold for blocks of cementitious material comprising a rectangular shaped frame having side and end walls, end plates having flanges on the edges hinged to corners of the frame and positioned to be held against the said end walls with the flanges thereof extended across the edges of said end walls, resilient means urging the said end plates to outwardly extended positions, a facing plate positioned in the bottom of the frame, a pallet in the top of the frame, said facing plate and pallet held in position in the frame by the flanges of the said end plates, said side and end walls of the frame having slots therein, and partitions extended through the frame and having projections at the ends positioned in the slots of the walls thereof.

5. A building block molding machine comprising a frame, a vibrating unit carried by the frame, an ejector slidably mounted in the frame, means manually actuating the ejector, a mold, and means pivotally mounting the mold on the frame whereby the mold may be positioned on the vibrating unit and swung about the pivotal mounting thereof to a position above the ejector.

6. In a building block molding machine, the combination which comprises a stand, a vibrator frame resiliently mounted on the frame, means for vibrating the vibrator frame, ejectors slidably mounted on the frame, means for manually actuating the ejectors, a mold and means pivotally mounting the mold whereby the mold is positioned with one side downwardly on the vibrator and swung about the pivotal mounting thereof to a position above the ejector with the opposite side downwardly.

7. A mold for blocks of cementitious material comprising a rectangular shaped frame having side and end walls, end plates having flanges on the edges hinged to corners of the frame and positioned to be held against the said end walls with the flanges thereof extended across the edges of said end walls, resilient means urging the said end plates to outwardly extended positions, a facing plate positioned in the bottom of the frame, a pallet in the top of the frame, said facing plate and pallet held in position in the frame by the flanges of the said end plates, a stand, a vibrator frame resiliently mounted on the stand, an ejector unit, means slidably mounting the ejector unit on the stand, means for manually actuating the ejector unit, means pivotally mounting the mold whereby the mold is positioned with one side downwardly on the vibrator frame and with the other side downwardly in a position above the ejector, and means for vibrating the vibrator frame.

8. In a mold for concrete building blocks, the combination which comprises a rectangular shaped frame having vertically disposed side and end walls, end plates having flanges on the upper and lower edges hinged to corners of the frame and positioned whereby the flanges extend across the end walls of the frame with the plates positioned against the said end walls, resilient means urging the said end plates to outwardly extended positions, a facing plate positioned in the bottom of the frame, a pallet positioned in the top of the frame, said facing plate and pallet held in position in the frame by the flanges of the said end plates, and means for ejecting the blocks from the frame.

9. In a mold for concrete building blocks, the combination which comprises a rectangular shaped frame having vertically disposed side and end walls, end plates having flanges on the upper and lower edges hinged to corners of the frame and positioned whereby the flanges extend across the end walls of the frame with the plates positioned against the said end walls, resilient means urging the said end plates to outwardly extended positions, a facing plate positioned in the bottom of the frame, a pallet positioned in the top of the frame, said facing plate and pallet held in position in the frame by the flanges of the said end plates, means vibrating the frame, and means for ejecting the blocks from the frame.

10. In a mold for concrete building blocks, the combination which comprises a rectangular shaped frame having vertically disposed side and end walls, end plates having flanges on the upper and lower edges hinged to corners of the frame and positioned whereby the flanges extend across the end walls of the frame with the plates positioned against the said end walls, resilient means urging the said end plates to outwardly extended positions, said walls of the frame having vertically disposed slots therein, an intermediate partition extended across the frame with the ends in the said slots of the walls thereof, a facing plate positioned in the bottom of the frame, a pallet positioned in the top of the frame, said facing plate and pallet held in position in the frame by the flanges of the said end plates, means vibrating the frame, and means for ejecting the blocks from the frame.

EMIL GARNICH.

REFERENCES CITED

The following references are of record in the file of this patent:

UNITED STATES PATENTS

| Number | Name | Date |
|---|---|---|
| 1,070,252 | Harrison et al. | Aug. 12, 1913 |
| 2,227,756 | Kirkham | Jan. 7, 1941 |